March 12, 1957  M. J. BOLTON ET AL  2,785,116

METHOD OF MAKING CAPACITOR ELECTRODES

Filed Jan. 25, 1954

Inventors
Michael J. Bolton,
Alfred F. Torrisi,
by Gilbert P. Tarleton
Their Attorney 2,785,116
Patented Mar. 12, 1957

2,785,116

METHOD OF MAKING CAPACITOR ELECTRODES

Michael J. Bolton, Rome, Ga., and Alfred F. Torrisi, Glens Falls, N. Y., assignors to General Electric Company, a corporation of New York Application January 25, 1954, Serial No. 405,870

2 Claims. (Cl. 204—37)

The present invention relates to an electrolytic capacitor and more particularly to a method of forming films on filming-metal electrodes for electrolytic capacitors. It is more specifically concerned with a method of electrolytically forming dielectric films on tantalum electrodes.

It is an object of the present invention to provide an improved method of forming on a tantalum foil electrode a dielectric oxide film having superior dielectric characteristics particularly at temperatures considerably higher than room temperature.

Another object of the invention is to provide a capacitor having enhanced stability at elevated operating temperatures.

A further object of the invention is to provide a multistage process for forming tantalum electrodes to give an efficient and stable oxidized dielectric surface.

Figure 1:
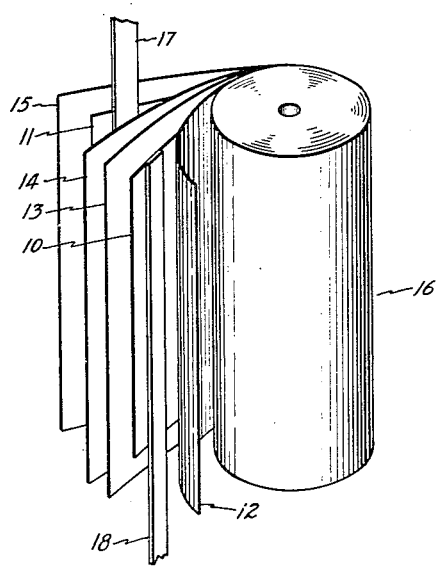
Figure 2:
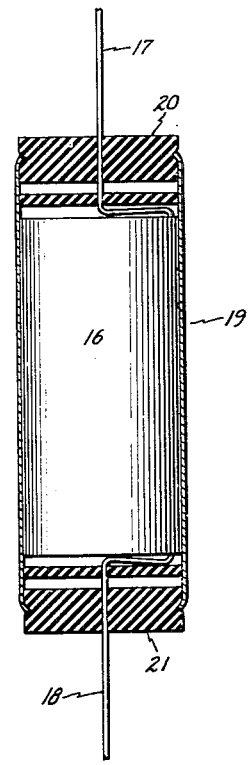

Additional objects and features of the invention will become apparent from the following detailed description and with reference to the accompanying drawing in which Figs. 1 and 2 illustrate electrolytic capacitors of a type in which electrodes of the present invention are used.

Briefly stated, in accordance with one of its aspects, the invention is directed to a method of forming a dielectric film on a tantalum capacitor electrode which comprises subjecting the electrode to a forming voltage while the electrode is immersed in a forming bath at a temperature of 85° C. to 200° C., subjecting the electrode to an oxidizing atmosphere at a temperature of 200° C. to 500° C., and resubjecting the electrode to a forming voltage while the electrode is immersed in a forming bath at a temperature of 85° to 200° C.

In Ruscetta and Torrisi application, Serial No. 253,-492, filed October 27, 1951, now Patent No. 2,739,110, dated March 20, 1956, and assigned to the same assignee as the present application, there is disclosed a method of forming a dielectric film on a tantalum capacitor electrode which comprises subjecting the electrode to a forming voltage while the electrode is immersed in a hot forming bath consisting of the residue obtained by heating a mixture of an ethanolamine, ethylene glycol, and ammonium borate at a temperature of at least 150° C. until all of the components of the heated mixture vaporizable below 150° C. are removed, the bath being held at a temperature above the melting point of the residue. Instead of such a single stage process, the electrode may be subjected to a two-stage process in which the first stage consists of subjecting the electrode to a forming voltage at a temperature from 85° C. to 100° C. in a forming electrolyte comprising a mixture of ammonium borate, a glycol, and a small amount of water, and thereafter subjecting the electrode to a treatment consisting of the single stage process described above. Diethylene glycol may be substituted for ethylene glycol and the ethanolamine most recommended is triethanolamine. While the proportions of components present in the mixture of Ruscetta and Torrisi are not critical recommended proportions in the case of the single-stage process are about 12% ammonium borate, 58% ethylene glycol, and 30% triethanolamine by weight. This mixture is heated until all of the ammonium borate is dissolved in the glycol and triethanolamine and thereafter the mixture is subjected to distillation until about 60% by weight has been removed by evaporation. In the case of the two-stage process, the mixture used in the first-stage consists of about 5 to 15% water and about 10 to 25% ammonium borate, the balance being ethylene glycol or diethylene glycol. The above processes are related to the process disclosed and claimed in Clark Patent 2,353,507, assigned to the same assignee as the present application.

We have discovered that an electrode prepared in accordance with the method of Ruscetta and Torrisi is further improved by treatment in an oxidizing atmosphere at a temperature between 200° C. to 500° C. followed by repeating the original forming step in accordance with the method of Ruscetta and Torrisi. While the present invention is particularly directed to a process including the treatment of Ruscetta and Torrisi, it is not necessarily so limited and may be used in conjunction with other electrolytic treatments to produce oxide surfaces upon tantalum strips.

A tantalum foil or strip formed by any of the methods previously decribed herein is maintained at a temperature between 200° C. and 500° C. in an oxidizing atmosphere for a period of time of the order of 15 minutes. The time of treatment is not critical. It is preferable to extend the time beyond 15 minutes for temperatures below 400° C. and this period may be shortened for temperatures higher than 450° C. No harm is done by subjecting the foil to prolonged heating but neither is there any additional benefit derived therefrom. A preferred temperature for the heat treatment is about 450° C.

Immediately after the heat treatment, the tantalum foils are considerably inferior in use to those not subjected to the heat treatment. However, before use the heat treated foils are subjected to a forming treatment which may be the same as that originally given or may vary therefrom.

We prefer in accordance with out invention to form a film on tantalum foil in accordance with the method of Ruscetta and Torrisi by subjecting the foil to a forming voltage in a forming bath at a temperature of 100° C. to 200° C., to subject the foil to air oxidation at a temperature of about 450° C. for about 15 minutes, and then to repeat the initial forming step in accordance with the method of Ruscetti and Torrisi. While air oxidation is usually the easiest way to create an oxidizing atmosphere, other oxidizing atmospheres may be used. If the atmosphere consists of pure oxygen, the time of treatment may be reduced somewhat.

The drawing illustrates capacitors of a type in which the tantalum electrodes of this invention may be used. In Fig. 1 there is illustrated a capacitor of the electrolytic type in which the numerals 10 and 11 indicate tantalum electrode strips formed in accordance with the present invention, while the numerals 12, 13, 14 and 15 indicate alternately positioned spacing strips of paper or other porous insulating material all wound into a compact roll 16 suitable for impregnation with a suitable electrolyte before or after insertion into a casing or container, as is well known in the art. Terminals or tap straps 17 and 18 of opposite polarity are respectively fixed in contact with the electrodes 10 and 11 and serve as terminals.

Fig. 2 illustrates a capacitor in which a roll capacitor body 16 is assembled in a case 19 with terminals 17 and 18 extending respectively through plugs or closures 20 and 21 of insulating materials which serves to seal off the opposite ends of the casing 19. It has previously been mentioned that immediately after heat treatment the electrodes are inferior to electrodes not subjected to a heat treatment. The final forming step not only cancels this inferiority but produces a superior electrode as shown below in Table I which sets forth test results of electrolytic capacitors containing electrodes formed in accordance with the treatments indicated.

Table I

| Capacitor Treatment | Hours of Operation to Bring to Indicated Decrease in Capacitance | | |
|---|---|---|---|
| | 5% | 10% | 15% |
| Formation Temp. 95° C., No heat treatment | 336 | 500 | 2,200 |
| Formation Temp. 95° C. (Before and after heat treatment), Heat treatment at 450° C | 1,200 | 2,500 | 3,200 |
| Formation Temp. 190° C., No heat treatment | 2,200 | 2,700 | 5,000 |
| Formation Temp. 190° C. (Before and after heat treatment), Heat treatment at 450° C | 2,448 | 5,000 | Over 5,172 |

The capacitors tested to provide the data of Table I were maintained at 85° C. at 150 volts direct current for the hours indicated. Their capacitance was then determined at 1000 cycles per second and a temperature of 25° C.

From Table I it may be seen that tantalum electrodes prepared in accordance with this invention result in capacitors having a greatly extended operating life as against capacitors in which the heat treatment of the tantalum electrodes was omitted. While the reason for the improved results of this invention cannot be determined with certainty, applicants advance the following explanation with the understanding that they are not bound thereby. The tantalum pentoxide film initially formed on the tantalum has as a necessary part thereof dissolved oxygen which is mobilized. Experiments show that there is no weight change accompanying the capacity change after heat treatment. Therefore, it is assumed that the mobile oxygen migrates toward the tantalum which is a well known getter. This migration results in a denser film in the direction of the metal-oxide interface which will give less electrical leakage and lower electrical losses. However, the migration also causes a shortage of mobile oxygen at the boundary of the film. The subsequent reforming step replenishes the supply of mobile oxygen to this region. Thus, applicants' process results in an electrode having a denser film of oxygen at the metal-oxide interface than an electrode in which the heat treatment is omitted.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. The method of forming a dielectric film on a tantalum capacitor electrode which comprises subjecting said electrode to anodic oxidation in an electrolytic bath at a temperature of 150° C. to 200° C., subjecting said electrode to an oxidizing atmosphere at a temperature of 200° C. to 500° C., and resubjecting said electrode to anodic oxidation in an electrolytic bath at a temperature of 150° C. to 200° C.

2. The method of forming a dielectric film on a tantalum capacitor electrode which comprises subjecting said electrode to anodic oxidation in an electrolytic bath at a temperature of about 190° C., subjecting said electrode to an oxidizing atmosphere at a temperature of about 450° C., and resubjecting said electrode to anodic oxidation in an electrolytic bath at a temperature of about 190° C.

References Cited in the file of this patent

UNITED STATES PATENTS

| 2,014,169 | Edelman | Sept. 10, 1935 |
| 2,052,575 | Lilienfeld | Sept. 1, 1936 |
| 2,073,060 | Harding et al. | Mar. 9, 1937 |
| 2,094,048 | Siegel | Sept. 28, 1937 |
| 2,122,392 | Robinson et al. | June 28, 1938 |
| 2,174,840 | Robinson et al. | Oct. 3, 1939 |

FOREIGN PATENTS

| 533,213 | Great Britain | Feb. 10, 1941 |